US010900889B1

(12) United States Patent
Williams et al.

(10) Patent No.: US 10,900,889 B1
(45) Date of Patent: Jan. 26, 2021

(54) MOLECULAR SENSORS FOR PRODUCT AUTHENTICATION

(71) Applicant: Amazon Technologies, Inc., Seattle, WA (US)

(72) Inventors: Robert Vaughan Williams, Edmonds, WA (US); Cynthia Wilson Williams, Seattle, WA (US); Abhishek Ojha, Seattle, WA (US); Neil Scott Ackerman, Bellevue, WA (US); Rotem Hershko, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1928 days.

(21) Appl. No.: 14/333,421

(22) Filed: Jul. 16, 2014

(51) Int. Cl.
*G01N 21/27* (2006.01)
*G06K 7/00* (2006.01)

(52) U.S. Cl.
CPC .......... *G01N 21/27* (2013.01); *G06K 7/0004* (2013.01)

(58) Field of Classification Search
CPC ..................................................... G01N 21/27
USPC ......................................................... 702/189
See application file for complete search history.

(56) References Cited

U.S. PATENT DOCUMENTS

| | | | |
|---|---|---|---|
| 7,612,923 B2 * | 11/2009 | Rusman | G06F 3/014 235/462.01 |
| 8,534,544 B1 * | 9/2013 | Eker | G06K 9/00577 235/375 |
| 9,058,615 B2 * | 6/2015 | Platek | G06Q 10/08 |
| 2006/0031148 A1 * | 2/2006 | O'Dell | G06K 17/0022 705/28 |
| 2009/0112101 A1 * | 4/2009 | Furness, III | G01J 3/02 600/477 |
| 2010/0208240 A1 * | 8/2010 | Schowengerdt | G07D 7/12 356/51 |
| 2010/0250457 A1 * | 9/2010 | Seitz | G06Q 30/0185 705/318 |
| 2012/0223130 A1 * | 9/2012 | Knopp | G01N 21/3586 235/375 |
| 2012/0330447 A1 * | 12/2012 | Gerlach | G01B 11/24 700/95 |
| 2017/0160131 A1 * | 6/2017 | Goldring | G01J 3/0264 |

FOREIGN PATENT DOCUMENTS

| | | | | |
|---|---|---|---|---|
| WO | WO 03044783 A1 * | 5/2003 | | G11B 7/246 |
| WO | WO 2016073571 A3 * | 7/2016 | | B42D 25/324 |

* cited by examiner

*Primary Examiner* — Ricky Ngon
(74) *Attorney, Agent, or Firm* — Kilpatrick Townsend & Stockton LLP

(57) ABSTRACT

Method and systems for assessing the authenticity of a candidate product compare molecular sensor generated spectrum data for the candidate product with spectrum data for the identified product. A method includes receiving data identifying a product and spectrum data generated by scanning the one or more locations of the candidate product with a molecular sensor that emits electromagnetic radiation onto the candidate product and includes a spectrometer to generate the received spectrum data for resulting electromagnetic radiation reflections from the candidate product. The received spectrum data is compared with spectrum data for the identified product. The candidate product is classified as authenticated or non-authenticated based on the results of the comparison between the received spectrum data for the candidate product and the spectrum data for the identified product.

15 Claims, 7 Drawing Sheets

MOLECULAR SENSORS FOR PRODUCT AUTHENTICATION

BACKGROUND

An electronic marketplace facilitates sales of items by multiple merchants through a common network site. Some electronic marketplaces may be associated with a fulfillment network. A merchant who participates in the electronic marketplace may be able to ship inventory to one or more fulfillment centers in the fulfillment network in order to outsource order fulfillment. The inventory of the merchant remains identified as owned by the merchant and separated from other products while being held at the fulfillment centers.

The inventory of the merchant, however, may include counterfeit products, which typically are of lesser quality than the corresponding authentic product. As a result, a purchaser of such a counterfeit product will typically receive less than what was bargained for. In addition, the electronic marketplace and/or the merchant may suffer a reduction in reputation due to the sale of the counterfeit product and may lose money on the transaction via reimbursement paid to the purchaser.

BRIEF DESCRIPTION OF THE DRAWINGS

Various embodiments in accordance with the present disclosure will be described with reference to the drawings, in which.

DETAILED DESCRIPTION

Figure 1:
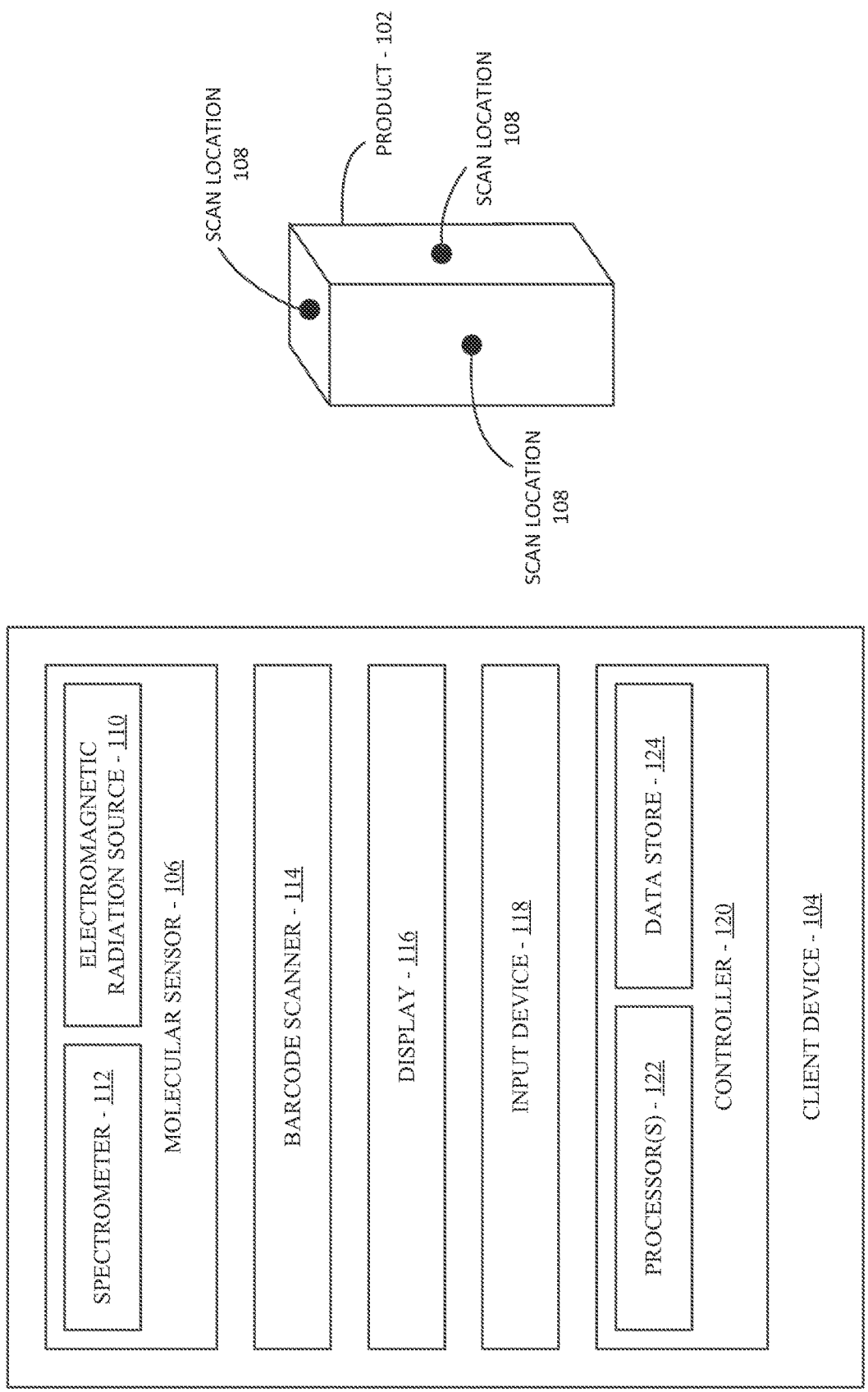
FIG. 1 illustrates a device for assessing the authenticity of a product, in accordance with many embodiments.

In the following description, various embodiments will be described. For purposes of explanation, specific configurations and details are set forth in order to provide a thorough understanding of the embodiments. It will, however, also be apparent to one skilled in the art that the embodiments may be practiced without the specific details. Furthermore, well-known features may be omitted or simplified in order not to obscure the embodiment being described.

Methods and systems for assessing the authenticity of products make use of a molecular sensor that can emit electromagnetic radiation (e.g., near infrared wavelength light) onto one or more locations of a product being assessed. The molecular sensor may include a spectrometer to generate spectrum data for the resulting electromagnetic radiation reflected from the product. The spectrum data generated for the product being assessed may be compared to data stored for one or more authentic instances of the product being assessed. The product being assessed can be classified as authenticated or non-authenticated based on the results of the comparison between the received spectrum data for the product being assessed and the spectrum data stored for the one or more authentic instances of the product. Accordingly, potentially counterfeit products can be proactively identified, blocked and/or removed from distribution so as to reduce the number of counterfeit products sold to customers, thereby enhancing overall customer satisfaction, reducing reimbursement costs and/or attracting more high sale price item business.

The methods and systems described herein provide numerous benefits, especially when used to assess the authenticity of high sale price items. A merchant can use the methods and systems described herein to assess the authenticity of a candidate product, thereby helping the merchant to make sourcing decisions by providing a way to test if a candidate product is authentic or counterfeit. The methods and systems described herein can be used in connection with a fulfillment center to assess the authenticity of incoming products, thereby providing the ability to block receipt of counterfeit products into the fulfillment center. For example, the molecular sensor can be integrated with a barcode scanner normally used to scan incoming products. The integrated device can be used to both identify the incoming products and to assess the authenticity of the incoming products so as to inhibit receipt of counterfeit products into the fulfillment center.

In one example, a merchant may access such a device (whether integrated with a scanner or not) and use it to take molecular readings of items at a brick-and-mortar store, at a materials handling facility, and/or at a manufacturer. The merchant may identify an item that they wish to source, and use the device to obtain a molecular signature. Based on specific parameters of the item, the device may instruct the merchant of a set of physical locations on the item for scanning. The merchant may scan the item at each of the physical locations and the device may generate a molecular signature for the item based at least in part on a combination of the readings. Alternatively, the device may provide the individual readings to a service provider, which may generate the signature and provide data back to the device. Once the molecular signature is determined, the service provider may compare the signature of the item with molecular signatures of authentic items of the same category, identifier, item, etc. If the molecular signature of the item matches that of an authenticated item, the service provider may transmit this information (e.g., the match) to the device. The device may indicate to the merchant whether the item being scanned is authentic or not.

The methods and systems described herein can be used innumerous applications such as material certification and brand certification. For example, the methods and systems described herein can be used to validate the material used to make a product, for example, to validate that a jewelry item is made from real gold, diamonds, etc. And, for products like high end fashion items, high end baggage, sun glasses, etc., the methods and systems described herein may be used to assess whether a candidate product is made from materials matching an authentic instance of the product being assessed.

The methods and systems described herein can also be used in the sale of food items. Food items for sale can be tested for ingredients associated with food allergies and/or for ripeness. For example, food items (e.g., tomatoes) can be tested to assess ripeness, thereby enabling a customer to select a food item according to a desired level of ripeness. Testing can be done to detect the presence or absence of food allergens such as gluten, lactose, meat (for vegetarian items), etc. Additionally, in some examples, an x-ray, gamma ray, alpha ray, beta ray, or any other kind of light may be used to identify the material of the candidate items. Sounds waves, as well as chemical sensors that can detect smell, may also be used to generate a molecular signature of the candidate items.

Individual customers can also make use of the methods and systems described herein. For example, a customer can use a portable phone/application/device that includes a molecular sensor in a brick and motor store to assess whether the product is made from the same material(s) as the authentic product.

Turning now to the drawings in which the same reference numbers are used to refer to the same or similar elements, FIG. 1 shows a simplified schematic representation of an electronic client device 104 for use in assessing the authenticity of a product 102, in accordance with many embodiments. The electronic client device 104 includes a molecular sensor 106. The molecular sensor 106 includes an electromagnetic radiation source 110 configured to emit electromagnetic radiation (e.g., near infrared light) onto a target location(s) 108 of the product 102. The molecular sensor 106 includes a spectrometer 112 that is used to generate spectrum data from the resulting light reflected from the target location(s) 108 of the product 102. In the illustrated embodiment, the electronic client device 104 further includes a barcode scanner 114, a display 116, an input device 118, and a controller 120. The controller 120 includes one or more processors 122 and a device data store 124.

In the illustrated embodiment, the molecular sensor 106 is included in the electronic client device 104. The molecular sensor 106, however, can be included in any suitable client device 104. For example, referring additionally to FIG. 2, the molecular sensor 106 can be included in any suitable electronic client device 104 operable to send requests, messages and/or information (e.g., identification of product being assessed, spectrum data generated by the molecular sensor and/or product parameter data such as size(s), weight(s) and color(s)) over an appropriate network 126 and receive requests, messages and/or information over the network 126 (e.g., spectrum data for authenticated instances of the product being assessed; product parameter data such as size(s), weight(s) and color(s); authentication classification, etc.). Examples of such client devices 104 include personal computers, cell phones, handheld messaging devices, laptop computers, set-top boxes, personal data assistants, electronic book readers and the like. The network 126 can include any suitable network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network 126 can be enabled by wired or wireless connections and combinations thereof. In this example, the network 126 includes the Internet, as the environment includes a Web server 128 for receiving requests and serving content in response thereto, although for other networks an alternative device serving a similar purpose could be used as would be apparent to one of ordinary skill in the art.

The illustrative environment includes at least one application server 130 and a data store 132. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data. The data store 132 can include any combination and number of data servers, databases, data storage devices and data storage media, in any standard, distributed or clustered environment. The application server 130 can include any appropriate hardware and software for interacting with the data store 132 as needed to execute aspects of one or more applications for the client device 104, handling a majority of the data access and logic for an application, such as an application for assessing the authenticity of a candidate product. The application server provides access control services in cooperation with the data store and is able to generate content such as text, graphics, audio and/or video to be transferred to the user, which may be served to the user by the Web server in the form of Hypertext Markup Language ("HTML"), Extensible Markup Language ("XML") or another appropriate structured language in this example. The handling of all requests and responses, as well as the delivery of content between the client device 104 and the application server 130, can be handled by the Web server 128. It should be understood that the Web and application servers are not required and are merely example components, as structured code discussed herein can be executed on any appropriate device or host machine as discussed elsewhere herein.

The data store 132 can include several separate data tables, databases or other data storage mechanisms and media for storing data relating to a particular aspect. For example, the data store illustrated includes mechanisms for storing production data 134 and user information 136, which can be used to serve content for the production side. The data store also is shown to include a mechanism for storing log data 138, which can be used for reporting, analysis or other such purposes. It should be understood that the data store can be used to store spectrum data as described herein. The data store 132 is operable, through logic associated therewith, to receive instructions from the application server 130 and obtain, update or otherwise process data in response thereto. In one example, a user might submit a request for authentication of a certain type of item. In this case, the data store might access the user information to verify the identity of the user and can access spectrum data stored for the item.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Figure 2:
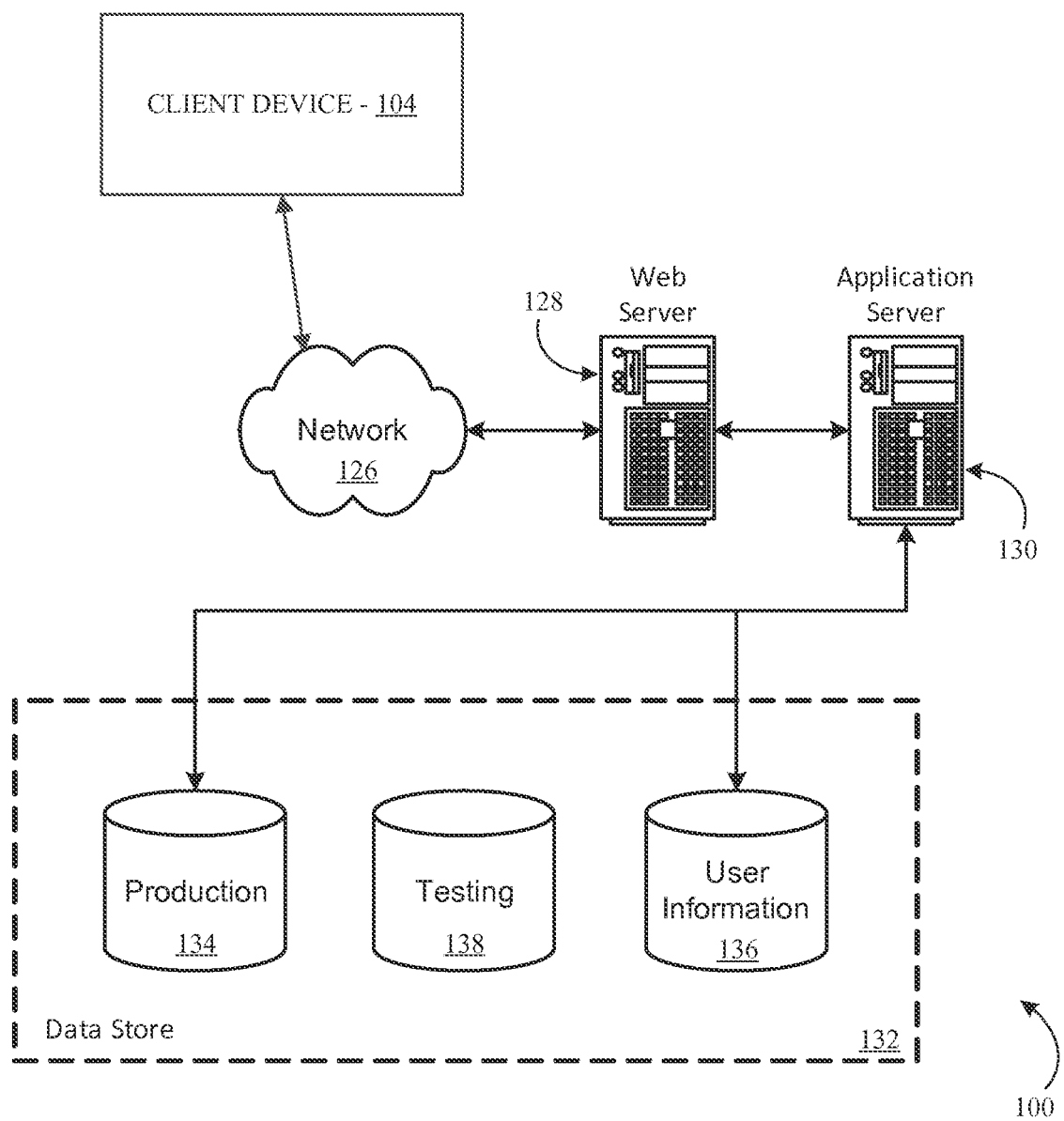
FIG. 2 illustrates a system for assessing the authenticity of a product, in accordance with many embodiments.

The environment in one embodiment is a distributed computing environment utilizing several computer systems and components that are interconnected via communication links, using one or more computer networks or direct connections. It will, however, be appreciated by those of ordinary skill in the art that such a system could operate equally well in a system having fewer or a greater number of components than are illustrated in FIG. 2. Thus, the depiction of the system 100 in FIG. 2 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HyperText Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

Example approaches that employ the client device 104 to assess the authenticity of the candidate product 102 will now be described. In many embodiments, the client device 104 is used by an operator working in a fulfillment center to receive scanning instructions (e.g., locations to be scanned) and to transmit product data including spectrum data generated by scanning a candidate product. In many embodiments, the authentication process of a candidate product 102 begins by identifying the candidate product 102. For example, the candidate product 102 can include a barcode label that is scanned by the client device 104 via the barcode scanner 114 to generate identification data for the candidate product 102. Alternatively, any suitable approach can be used to generate the identification data for the candidate product 102, including having the user enter the identification data via the input device 118. The identification data can be displayed on the display 116 for confirmation by the user. The identification data for the can be sent over the network 126 to the application server 130.

Based on the identification data for the candidate product 102, location data defining the location of the target locations 108 can be retrieved from the data store 132 and sent over the network 126 to the client device 104. Alternatively, the location data defining the location of the target locations 108 can be stored locally in the client device 104 in the device data store 124. The location data can be displayed to the user via the display 116 as a guide to the user for scanning the locations 108 using the molecular sensor 106. As yet another alternative, one or more standardized locations 108 can be used. For example, standardized locations can be defined as any suitable combination of top, bottom, right, left, front, and back of a product for use as the target locations 108.

The user scans each of the locations 108 via the molecular sensor 106. Electromagnetic radiation emitted by the electromagnetic radiation source 110 is directed onto each of the target locations 108 and corresponding spectrum data is generated via the spectrometer 112 for the resulting light reflected from the target locations 108. The spectrum data for each of the target locations 108 can be transferred over the network 126 to the application server 130 for use in performing an assessment of the authenticity of the candidate product 102.

Figure 3:
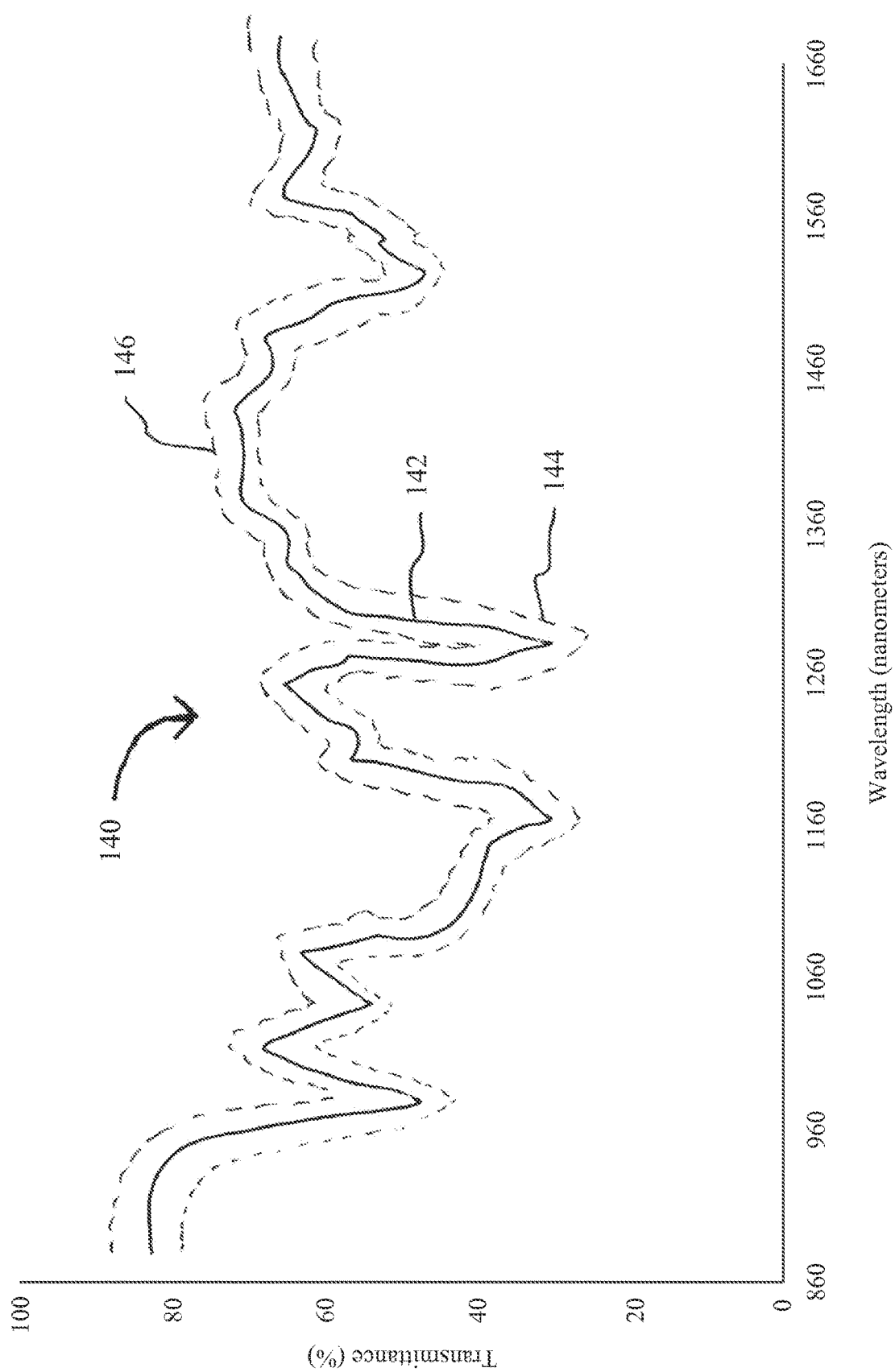
FIG. 3 illustrates spectrum data stored for a scan location of an authentic product, in accordance with many embodiments.

In many embodiments, spectrum data corresponding to one or more authentic instances of the product 102 is stored in the data store 132. For example, FIG. 3 illustrates spectrum data 140 corresponding to authentic instances of a hypothetical product. The spectrum data 140 can include a nominal spectrum data curve 142, a lower limit spectrum data curve 144, and an upper limit spectrum data curve 146. The illustrated spectrum data curves 142, 144, 146 show how the transmittance percentage of the light reflected from a target location 108 varies as a function of wavelength. The spectrum data 140 can be stored in any suitable location, such as in the data store 132 and/or in the device data store 124.

In assessing the authenticity of the candidate product 102, the spectrum data generated by scanning the target locations 108 is compared to corresponding spectrum data 140 stored for one or more authentic instances of the product 102. Any suitable criteria can be used to classify the candidate product as either authenticated or non-authenticated based on the results of the comparison. For example, the candidate product 102 can be classified as authenticated where the spectrum data for each of the target locations 108 lies between a lower limit data curve 144 and an upper limit spectrum data curve 146 for the target location for each wavelength of any suitable combination of wavelengths. As another example, the candidate product 102 can be classified as non-authenticated wherein the spectrum data for at least one of the target locations 108 does not lie between the lower limit data curve 144 and the upper limit data curve for the target location for at least one wavelength. The comparison between the spectrum data for each of the target locations 108 can be accomplished by any suitable device, including the application server 130 and/or the device processor(s) 122. And while the lower limit data curve 144 and the upper limit data curve 146 are illustrated as having similar offsets from the nominal spectrum data curve 142, any suitable variations between the nominal spectrum data curve 142 and either of the lower and upper limit data curves 144, 146, can be used. For example, the offsets between the nominal spectrum data curve 142 and the lower and upper limit data curves 144, 146 can differ, and can differ as a function of wavelength. In many embodiments, the offsets are statistically based on a population of authentic instances of the identified product and can be selected to reflect a desired confidence margin. Computer software can be used to determine the confidence margin employed based on any suitable criteria. For example, one or more characteristics of the product being assessed can be used to determine the confidence margin employed. Such characteristics can include, but not limited to, product type, product identification, rate of past counterfeit product determinations including for similar products, price, material and/or whether the rate at which the product is being received since an abnormally high rate. An abnormally high receipt rate for the product may be indicative of a greater likelihood that the product being assessed is counterfeit. Such characteristics can also include the results of authentications for candidate products from a particular seller, counterfeit complaints, seller score, customer reviews, etc.

The classification as authenticated or non-authenticated can then be transferred over the network 126 to the client device 104 for display to the user via the display 116. The user can then take appropriate action based upon the classification of the candidate product 102 as authenticated or non-authenticated.

Figure 4:
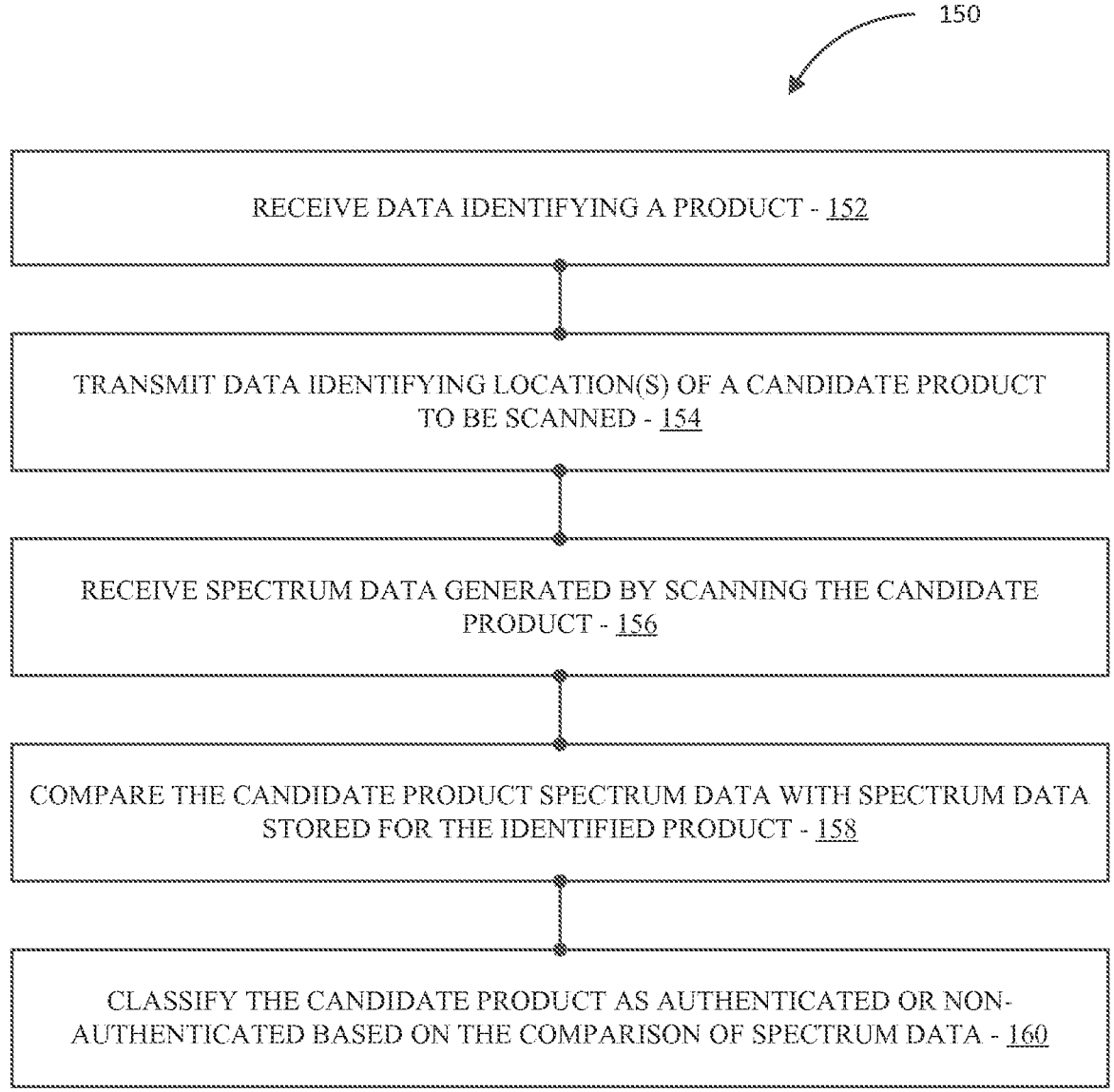
FIG. 4 is a simplified diagram of acts of a computer-implemented method for assessing the authenticity of a product, in accordance with many embodiments.

FIG. 4 shows acts of a process 150 of assessing the authenticity of a product, in accordance with many embodiments. The process 150 includes receiving data identifying a product (act 152). For example, such identification data can be received by the application server 130 from the client device 104 via the network 126. Based on the identification of the product, data identifying one or more locations of the candidate product to be scanned can be transmitted (act 154). For example, data identifying one or more locations of the candidate product to be scanned can be retrieved from storage in the data store 132 by the application server 130 and transmitted by the application server 130 over the network 126 to the client device 104. In act 156, spectrum data generated by scanning the candidate product is received. For example, a user can scan the target locations 108 of the candidate produce 102 and the spectrum data generated by scanning the target locations 108 can be transmitted over the network 126 by the client device 104 and received by the application server 130. In act 158, the spectrum data for the target locations 108 is compared with spectrum data stored for the identified product. For example, the application server 130 can retrieve the spectrum data 140 corresponding to authenticate versions of the identified product from the data store 132 and accomplish the comparison. In act 160, the candidate product 102 is classified at authenticated or non-authenticated based on the results of the comparison of the spectrum data. While examples given for the process 150 are described with reference to the process 150 being accomplished via the application server 130, any suitable device can be used to accomplish the process 150. For example, the process 150 can be accomplished locally via the client device 104, wherein the authentic spectrum data is stored on the device data store 124 and the comparison and classification being accomplished via the one or more processors 122.

Figure 5:
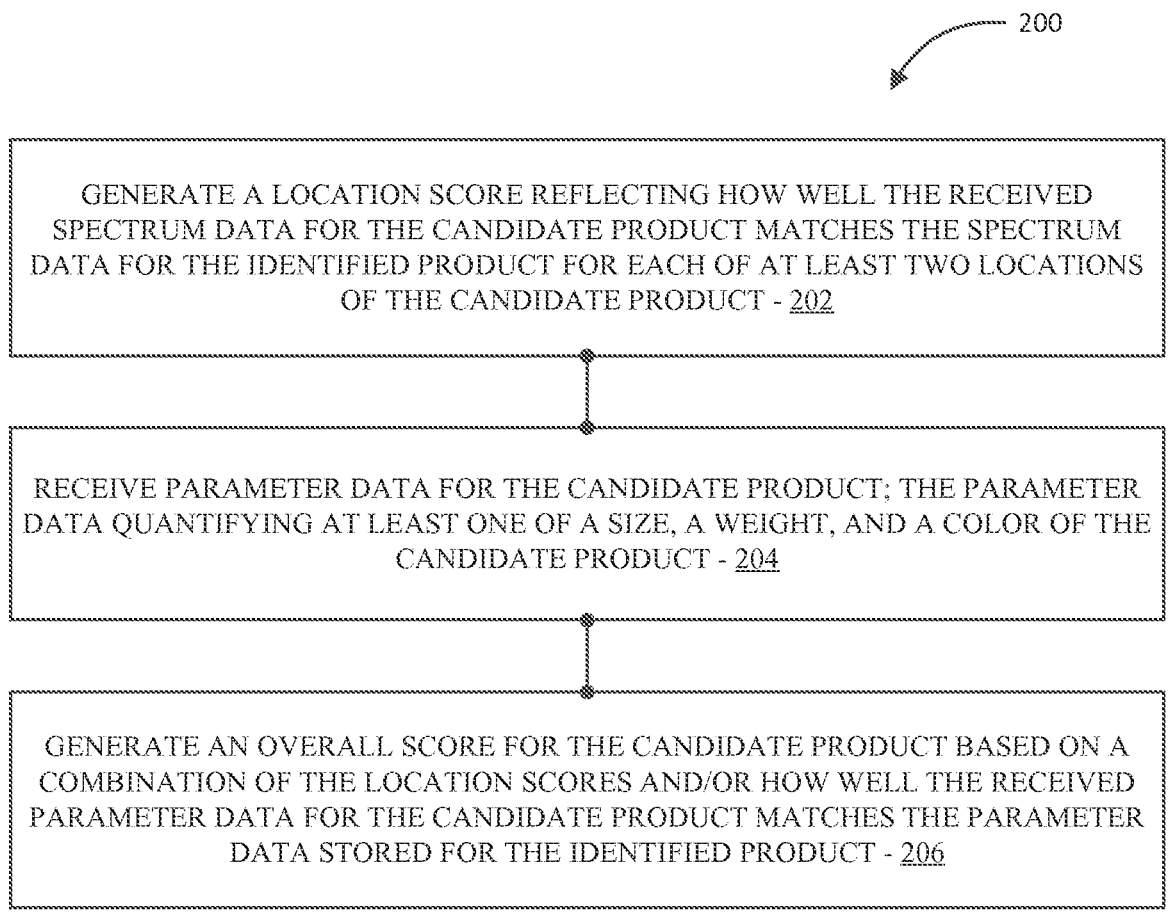
FIG. 5 is a simplified diagram of acts of a computer-implemented method for generating an overall authenticity score for a candidate product, in accordance with many embodiments.

FIG. 5 shows acts of a process 200 of generating an overall score reflecting how well a candidate product matches authenticated instances of the product, in accordance with many embodiments. The process 200 can be used in conjunction with the process 150 to assess the authenticity of a candidate product. In act 202, a location score is generated that reflects how well the received spectrum data for the candidate produce matches the spectrum data stored for authentic instances of the identified produce for each of at least two target locations of the candidate product. Any suitable approach can be used to generate each of the locations scores. For example, a location score can be based on how well the spectrum data for the respective target location 108 matches the nominal spectrum data curve 142 for one or more wavelengths. For example, one or more large deviations between the spectrum data generated for the candidate product and the spectrum data based on the authentic product can result in a lower location score while the lack of any large deviation can result in a higher location score.

In act 204, parameter data for the candidate product is received. The parameter data can include at least one of one or more sizes, one or more weights, and/or one or more colors of the candidate product.

In act 206, an overall score is generated for the candidate product. The overall score is based on the locations scores and/or how well the received parameter data for the candidate product matches parameter data stored for the identified product. For example, the overall score can be higher if all the received parameter data for the candidate product lies within acceptable ranges for the identified product and the location scores are high. The acceptable ranges can be statistically based on a population of authentic instances of the identified product and can be set to reflect a desired confidence margin. The overall score can be lower if any of the received parameter data for the candidate product does not lie within acceptable ranges for the identified product and/or one or more of the location scores is low. The overall score can be used to classify the candidate product as authenticated or non-authenticated.

Figure 6:
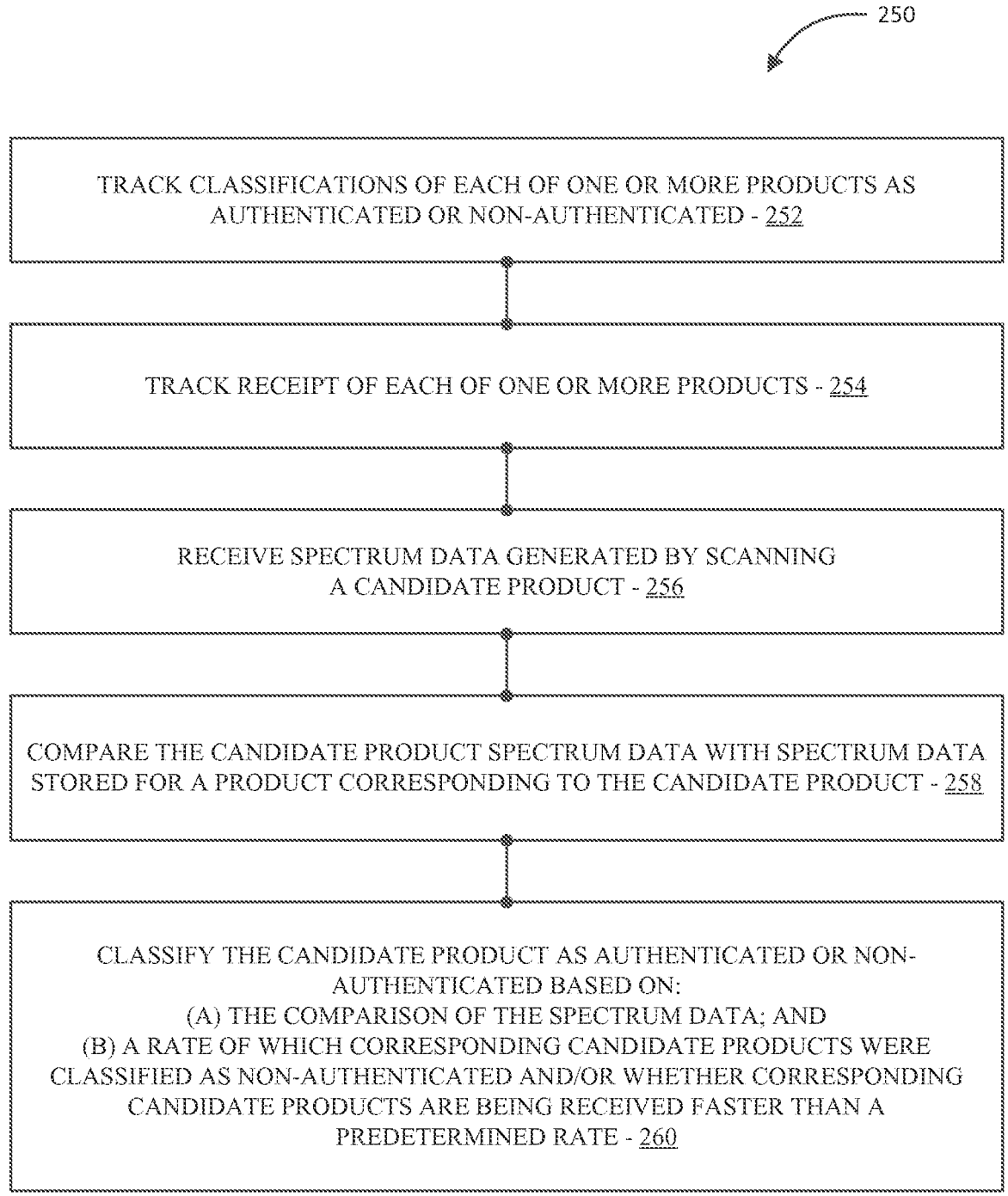
FIG. 6 is a simplified diagram of acts of a computer-implemented method for assessing the authenticity of a product, in accordance with many embodiments.

FIG. 6 shows acts of a process 250 of assessing the authenticity of a product, in accordance with many embodiments. The process 250 includes tracking classifications of each of one or more products as authenticated or non-authenticated (act 252). By tracking previous classifications, the rate at which particular products are non-authenticated (e.g., due to being counterfeit) can be determined and used for assessing future instances of the products. For example, where the rate of previous non-authentications is relatively low or zero, the assessment of the candidate product can be accomplished so as to reflect a reduced level of diligence suitable to the low or non-zero rate of previous non-authentications (e.g., by permitting increased deviations between spectrum data for the candidate product and nominal spectrum data for authenticated versions of the candidate product; decreasing the number of locations of the candidate product that are scanned; and/or permitting increased deviations between parameter data such as color, weight, size, for the candidate produce and parameter data for authenticated versions of the candidate product). Likewise, where the rate of previous non-authentications is relatively high, the assessment of the candidate produce can be accomplished so as to reflect in increased level of diligence suitable to the relatively high rate of previous non-authentications (e.g., by permitting decreased deviations between spectrum data for the candidate product and nominal spectrum data for authenticated versions of the candidate product; increasing the number of locations of the candidate product that are scanned; and/or permitting decreased deviations between parameter data such as color, weight, size, for the candidate produce and parameter data for authenticated versions of the candidate product).

The process 250 can include tracking receipt of each of one or more products (act 254). By tracking receipts of particular products, the rate at which a product is being received can be tracked and used for assessing instances of the product that are subsequently received. In many instances, it has been observed that the existence of counterfeit instances of a product adds to the overall supply of the product and is reflected by an increase in the rate at which the product is received into a fulfillment network. By detecting when the rate at which the product(s) is received into the fulfillment network exceeds a predetermined regular receipt rate limit, an increase in the likelihood of counterfeit instances of the product may be detected and used to implement increased diligence in the authentication assessment of the product.

In act 256, spectrum data generated by scanning the candidate product is received. For example, a user can scan the target locations 108 of the candidate produce 102 and the spectrum data generated by scanning the target locations 108 can be transmitted over the network 126 by the client device 104 and received by the application server 130. In act 258, the spectrum data for the target locations 108 is compared with spectrum data stored for the identified product. For example, the application server 130 can retrieve the spectrum data 140 corresponding to authenticate versions of the identified product from the data store 132 and accomplish the comparison.

In act 260, the candidate product 102 is classified at authenticated or non-authenticated based on: (a) the comparison of the spectrum data; and (b) a rate of which previous corresponding candidate products were classified as non-authenticated and/or whether corresponding candidate products are being received faster than the regular receipt rate limit. For example, as described herein, where the rate of counterfeit instances of the product is not low and/or the rate of receipt of the product is higher than the regular receipt rate limit, increased diligence can be employed in the classification of the product as authenticated or non-authenticated.

Figure 7:
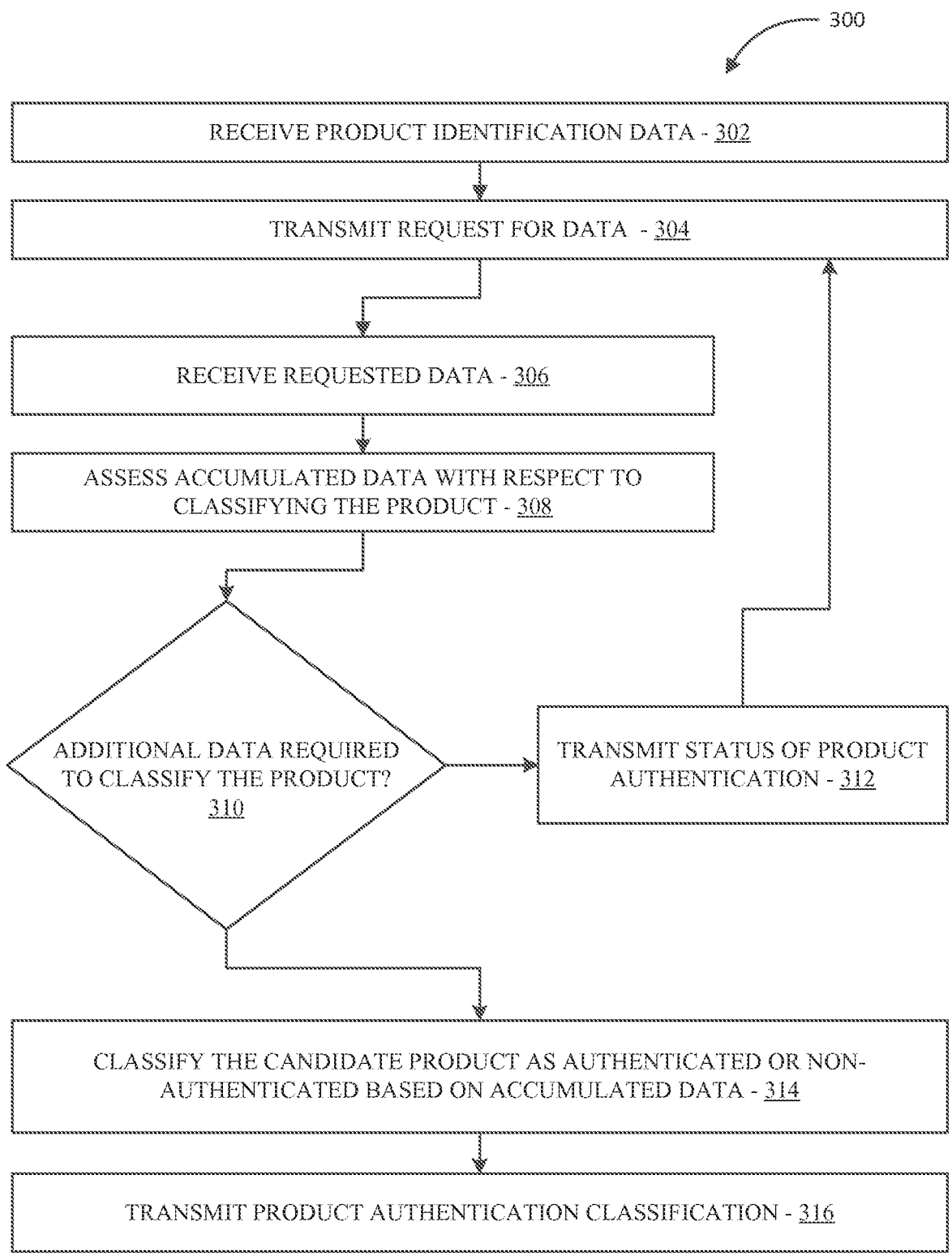
FIG. 7 is a simplified diagram of acts of a computer-implemented method for assessing the authenticity of a product, in accordance with many embodiments.

FIG. 7 shows acts of a process 300 of assessing the authenticity of a product, in accordance with many embodiments. The process 300 is configured to enable classification of a candidate product with minimal product data so as to attempt to reduce the amount of candidate product data that is collected as part of the classification of the candidate product as authenticated or non-authenticated.

The process 300 includes receiving data identifying a product (act 302). For example, such identification data can be received by the application server 130 from the client device 104 via the network 126.

In act 304, a request for data for the candidate product is transmitted. For example, the request for data can include a request for spectrum data for one or more locations of the candidate product. As part the request for spectrum data, based on the identification of the product, data identifying one or more locations of the candidate product to be scanned can be transmitted. The data identifying one or more locations of the candidate product to be scanned can be retrieved from storage in the data store 132 by the application server 130 and transmitted by the application server 130 over the network 126 to the client device 104. As another example, the request for data can include a request for parameter data for the candidate product (e.g., a size(s), a weight(s) and/or a color(s) of the candidate product being assessed).

In act 306, the requested data is received. When the requested data includes spectrum data, the spectrum data generated by scanning the candidate product is received. For example, a user can scan the target locations 108 of the candidate produce 102 and the spectrum data generated by scanning the target locations 108 can be transmitted over the network 126 by the client device 104 and received by the application server 130. When the requested data includes parameter data for the candidate product, the received data can include at least one of one or more sizes, one or more weights, and/or one or more colors of the candidate product.

In act 308, the accumulated data is assessed in an attempt to classify the candidate product as authenticated or non-authenticated. When the accumulated data includes spectrum data, the spectrum data for the target locations 108 can be compared with spectrum data stored for the identified product. For example, the application server 130 can retrieve the spectrum data 140 corresponding to authenticate versions of the identified product from the data store 132 and accomplish the comparison. When the accumulated data includes parameter data for the candidate product, the parameter data for the candidate product can be compared with parameter data stored for the identified product. The assessment can also include, as describe herein, a rate of which corresponding candidate products were classified as non-authenticated and/or whether corresponding candidate products are being received faster than a regular receipt limit rate. The assessment of the accumulated data can result in the candidate product being classified as authenticated, non-authenticated, or indeterminate with respect to whether the product is authentic or not.

The results of the assessment of act 308 is used to determine whether to request additional data to classify the candidate product as authenticated or non-authenticated (act 310). If the assessment of act 308 results in the candidate product being classified as either authenticated or non-authenticated, no additional data is requested. If the assessment of act 308 results in the candidate product being classified as indeterminate with respect to product authenticity, additional data is requested.

When additional data is requested, the status of the product authentication can be transmitted (act 312). When act 308 is accomplished via the application server 130, the status of the product authentication can be transferred over the network 126 to the client device 104 for display to the user of the client device 104. Any suitable display of the authentication status on the client device 104 can be employed. For example, a green indicator can be displayed to indicate that the candidate product has been classified as authenticated; a red indicator light can be displayed to indicate that the candidate product has been classified as non-authenticated; and a yellow indicator light can be displayed to indicate that the status of the authentication of the candidate product is indeterminate with respect to the currently accumulated assessment data for the candidate product.

When additional data is requested, the process 300 returns to act 304 to transmit a request for additional data to supplement the currently accumulated data for the candidate product. For example, the additional data requested can include any suitable additional spectrum data for one or more additional locations on the candidate product and/or additional parameter data for the candidate product. In response to the request for supplemental data, the supplemental data is received (act 306) and the accumulated data is assessed (act 308). The iterative loop from act 312 to act 304 through 310 can be repeated until the accumulated data results in a classification of the candidate product as being classified as either authenticated or non-authenticated. Alternatively, the process 300 can terminate with the candidate product being classified as indeterminate with respect to authentication after a suitable maximum amount of accumulated data for the candidate product is assessed so as to avoid expending additional effort in trying to authenticate or non-authenticate any particular candidate product.

In act 314, the candidate product 102 is classified at authenticated or non-authenticated based on the accumulated data for the candidate product. In act 316, the authentication classification for the candidate product is transmitted. For example, when act 308 is accomplished via the application server 130, the status of the product authentication can be transferred over the network 126 to the client device 104 for display to the user of the client device 104. Any suitable display of the authentication status on the client device 104 can be employed. For example, a green indicator can be displayed to indicate that the candidate product has been classified as authenticated and a red indicator light can be displayed to indicate that the candidate product has been classified as non-authenticated.

The any of the individual acts of the processes 150, 200, 250, 300 described herein can be combined in any suitable manner to classify a candidate product as authenticated or non-authenticated. For example, a process for classifying a candidate product as authenticated or non-authenticated can include comparing spectrum data for a plurality of locations of the candidate product, exercising a level of diligence based on the level of past non-authentications, exercising a level of diligence based on whether the rate of receipt of the product exceeds a regular receipt rate limit, determining an overall score based on a combination of locations scores and/or using an iterative process that requests and assesses additional product data to classify a candidate product as authenticated or non-authenticated.

While examples given for the processes 150, 200, 250, 300 are described with reference to being accomplished via the application server 130, any suitable device can be used to accomplish the processes. For example, the processes can be accomplished locally via the client device 104, wherein the authentic spectrum data, the classification tracking data, and/or data for the rate of receipt of the product is stored on or retrieved to the device data store 124 and the comparison and classification is accomplished via the one or more processors 122.

Some or all of the processes 150, 200, 250, 300 (or any processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A computer-implemented method, comprising:
   storing location data for different products on one or more memory devices, the location data identifying one or more locations on each of the products;
   storing authenticated spectrum data on the one or more memory devices for each of the one or more locations for each of the products, the authenticated spectrum data corresponding to authentic instances of the products;
   receiving, from a scanning device, product data identifying one of the products, the scanning device comprising a molecular sensor that emits near infrared wavelength light onto a candidate product and a spectrometer that generates spectrum data for resulting reflections of the near infrared wavelength light from the candidate product;
   retrieving the location data stored on the one or more memory devices for the identified product;
   transmitting the location data for the identified product to the scanning device;
   receiving, from the scanning device, the spectrum data from the one or more locations on the candidate product;
   comparing the received spectrum data for the candidate product with the authenticated spectrum data for the identified product;
   classifying the candidate product as authenticated or non-authenticated based at least in part on the comparison between the received spectrum data for the candidate product and the authenticated spectrum data for the identified product, wherein the classification of the candidate product as authenticated or non-authenticated is further based on at least one of:
      whether a rate at which the candidate product corresponding to the identified product is being received exceeds a predetermined reception rate, and
      data quantifying a rate at which previous candidate products corresponding to the identified product were classified as non-authenticated; and
   providing the classification to the scanning device.

2. The computer-implemented method of claim 1, wherein the one or more locations of the identified product are based at least in part on an attribute of the candidate product.

3. The computer-implemented method of claim 1, further comprising:
   generating individual location scores reflecting how well the received spectrum data for the candidate product matches the authenticated spectrum data for the identified product for at least two scanned locations of the candidate product; and
   generating an overall score for how well the received spectrum data for the candidate product matches the authenticated spectrum data for the identified product based at least in part on a combination of the individual location scores.

4. The computer-implemented method of claim 1, wherein the comparison between the received spectrum data for the candidate product and the authenticated spectrum data for the identified product comprises determining whether the received spectrum data for the candidate product differs from the authenticated spectrum data for the identified product within a confidence margin.

5. The computer-implemented method of claim 1, further comprising receiving parameter data for the candidate product, the parameter data quantifying at least one of a size, a weight, or a color of the candidate product, and the classification of the candidate product being authenticated or non-authenticated further based at least in part on a second comparison of the received parameter data for the candidate product and authenticated parameter data for the identified product.

6. The computer-implemented method of claim 1, wherein the classification of the candidate product as authenticated or non-authenticated is further based at least in part on whether the rate at which the candidate product corresponding to the identified product is being received exceeds the predetermined reception rate.

7. The computer-implemented method of claim 1, wherein the classification of the candidate product as authenticated or non-authenticated is further based at least in part on the data quantifying the rate at which previous candidate products corresponding to the identified product were classified as non-authenticated.

8. The computer-implemented method of claim 1, wherein the classification of the candidate product as authenticated or non-authenticated comprises:
   identifying the candidate product as being neither authenticated nor non-authenticated based at least in part on results of the comparison between the received spectrum data for the candidate product and the authenticated spectrum data for the identified product;
   receiving additional spectrum data generated from one or more additional locations of the candidate product with the molecular sensor of the scanning device; and
   comparing the additional spectrum data for the candidate product with the authenticated spectrum data for the identified product.

9. A tangible computer-readable medium storing non-transitory computer-executable instructions that, when executed by one or more computer processors, cause the one or more computer processors to:
   receive item data identifying an item;
   retrieve location data from one or more memory devices storing location data identifying one or more locations on each of a plurality of products, the retrieved location data identifying the one or more locations on the identified item;
   transmit the retrieved location data to a display device;
   receive spectrum data for a candidate item generated by scanning one or more locations on the candidate item matching the one or more locations on the identified item with a scanning device, the scanning device comprising a molecular sensor that emits near infrared wavelength light onto the candidate item and a spectrometer that generates the received spectrum data for resulting reflections of the near infrared wavelength light from the candidate item;
   compare the received spectrum data for the candidate item with stored spectrum data for the identified item;
   classify the candidate item on an authentication scale based at least in part on the comparison between the received spectrum data for the candidate item and the stored spectrum data for the identified item, wherein the classification of the candidate item is further based at least in part on at least one of:
      whether a rate at which the candidate item corresponding to the identified item is being received exceeds a predetermined reception rate, and
      data for the identified item quantifying a rate at which previous candidate items corresponding to the identified item were classified as non-authenticated; and
   transmit the classification of the candidate item to a client device that includes the molecular sensor.

10. The computer-readable medium of claim 9, wherein:
    the retrieved location data is indicative of a plurality of locations of the candidate item to be scanned; and
    the received spectrum data is generated by enabling the scanning device to scan the plurality of locations of the candidate item.

11. The computer-readable medium of claim 10, wherein the plurality of locations of the identified item are based at least in part on an attribute of the identified item.

12. The computer-readable medium of claim 11, wherein the attribute of the identified item comprises a material with which the identified item is made or a part category associated with the identified item.

13. The computer-readable medium of claim 9, wherein the instructions further cause the one or more computer processors to receive parameter data for the candidate item, the parameter data quantifying at least one of a size, a weight, or a color of the candidate item, and the classification of the candidate item being further based at least in part on a comparison of the received parameter data for the candidate item and stored parameter data for the identified item.

14. The computer-readable medium of claim 9, wherein the classification of the candidate item is further based at least in part on whether the rate at which the candidate item corresponding to the identified item is being received exceeds the predetermined reception rate.

15. The computer-readable medium of claim 9, wherein the classification of the candidate item is further based at least in part on the data for the identified item quantifying the rate at which previous candidate items corresponding to the identified item were classified as non-authenticated.

* * * * *

UNITED STATES PATENT AND TRADEMARK OFFICE
CERTIFICATE OF CORRECTION

| | | |
|---|---|---|
| PATENT NO. | : 10,900,889 B1 | Page 1 of 1 |
| APPLICATION NO. | : 14/333421 | |
| DATED | : January 26, 2021 | |
| INVENTOR(S) | : Robert Vaughan Williams et al. | |

It is certified that error appears in the above-identified patent and that said Letters Patent is hereby corrected as shown below:

On the Title Page

Item (72) Inventors:
Delete: "Abhishek Ojha, Seattle, WA (US)"
Insert: -- Abhishek Ojha, Bellevue, WA (US) --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*